United States Patent
Walston et al.

(10) Patent No.: US 9,176,859 B2
(45) Date of Patent: Nov. 3, 2015

(54) SYSTEMS AND METHODS FOR IMPROVING THE PERFORMANCE OF NON-VOLATILE MEMORY OPERATIONS

(75) Inventors: Wesley Walston, Huntington Beach, CA (US); Mark S. Diggs, Laguna Hills, CA (US)

(73) Assignee: SILICONSYSTEMS, INC., Aliso Viejo, CA (US)

(*) Notice: Subject to any disclaimer, the term of this patent is extended or adjusted under 35 U.S.C. 154(b) by 174 days.

(21) Appl. No.: 12/350,180

(22) Filed: Jan. 7, 2009

(65) Prior Publication Data

US 2010/0174849 A1 Jul. 8, 2010

(51) Int. Cl.
G06F 12/02 (2006.01)
G06F 3/06 (2006.01)
G06F 13/16 (2006.01)

(52) U.S. Cl.
CPC ............ G06F 12/0246 (2013.01); G06F 3/061 (2013.01); G06F 13/161 (2013.01); G06F 2212/1016 (2013.01)

(58) Field of Classification Search
USPC .................................. 711/103, 146
See application file for complete search history.

(56) References Cited

U.S. PATENT DOCUMENTS

| 4,644,494 A | 2/1987 | Muller |
| 4,937,736 A | 6/1990 | Chang et al. |
| 5,018,096 A | 5/1991 | Aoyama |
| 5,640,529 A * | 6/1997 | Hasbun ........................ 711/103 |
| 5,768,189 A * | 6/1998 | Takahashi ................ 365/185.18 |
| 5,781,783 A * | 7/1998 | Gunther et al. ............... 713/320 |
| 5,860,137 A | 1/1999 | Raz et al. |
| 5,929,590 A * | 7/1999 | Tang ............................. 318/701 |
| 6,052,799 A | 4/2000 | Li et al. |

(Continued)

FOREIGN PATENT DOCUMENTS

| CN | 1662886 A | 8/2005 |
| CN | 1761935 A | 4/2006 |
| CN | 1985239 A | 6/2007 |

OTHER PUBLICATIONS

Micron Technical Note, "NAND Flash 101: An Introduction to NAND Flash and How to Design It in to Your Next Product", TN-29-19, Nov. 2006, http://download.micron.com/pdf/technotes/nand/tn2919.pdf, pp. 1-28.

(Continued)

Primary Examiner — Kaushikkumar Patel
(74) Attorney, Agent, or Firm — Shumaker & Sieffert, P.A.

(57) ABSTRACT

Disclosed herein are systems and methods that recognize and recapture potentially unused processing time in typical page program and block erase operations in non-volatile memory (NVM) devices. In one embodiment, a characterization module within a controller executes a characterization procedure by performing page program and block erase operations on one or more NVM devices in an array and storing execution time data of the operations in a calibration table. The procedure may be executed at start-up and/or periodically so that the time values are reflective of the actual physical condition of the individual NVM devices. A task manager uses the stored time values to estimate the time needed for completing certain memory operations in its task table. Based on the estimated time for completion, the task manager assigns tasks to be executed during page program and/or block erase cycles, so that otherwise unused processing time can be utilized.

27 Claims, 8 Drawing Sheets

(56) References Cited

U.S. PATENT DOCUMENTS

| | | | |
|---|---|---|---|
| 6,134,631 A | 10/2000 | Jennings, III | |
| 6,173,360 B1 | 1/2001 | Beardsley et al. | |
| 6,286,087 B1 | 9/2001 | Ito et al. | |
| 6,324,627 B1 | 11/2001 | Kricheff et al. | |
| 6,484,229 B1 | 11/2002 | Ichikawa et al. | |
| 6,633,963 B1 | 10/2003 | Ellison et al. | |
| 6,640,268 B1 | 10/2003 | Kumar | |
| 6,654,850 B2 | 11/2003 | Fox et al. | |
| 6,661,724 B1 * | 12/2003 | Snyder et al. | 365/211 |
| 6,694,381 B1 | 2/2004 | Lo et al. | |
| 6,792,519 B2 | 9/2004 | Constable et al. | |
| 6,856,556 B1 | 2/2005 | Hajeck | |
| 6,968,434 B2 | 11/2005 | Kamano et al. | |
| 7,003,644 B2 * | 2/2006 | Heath et al. | 711/167 |
| 7,024,410 B2 | 4/2006 | Ito et al. | |
| 7,114,051 B2 | 9/2006 | Guu et al. | |
| 7,126,857 B2 | 10/2006 | Hajeck | |
| 7,139,871 B2 | 11/2006 | Mizuno | |
| 7,139,890 B2 | 11/2006 | Moran et al. | |
| 7,149,046 B1 | 12/2006 | Coker et al. | |
| 7,170,788 B1 | 1/2007 | Wan et al. | |
| 7,213,117 B2 | 5/2007 | Wakabayashi et al. | |
| 7,224,604 B2 | 5/2007 | Lasser | |
| 7,287,118 B2 | 10/2007 | Chang et al. | |
| 7,307,881 B2 * | 12/2007 | Chen et al. | 365/185.09 |
| 7,315,917 B2 | 1/2008 | Bennett et al. | |
| 7,330,954 B2 * | 2/2008 | Nangle | 711/170 |
| 7,408,804 B2 | 8/2008 | Hemink et al. | |
| 7,430,136 B2 | 9/2008 | Merry, Jr. et al. | |
| 7,441,067 B2 | 10/2008 | Gorobets et al. | |
| 7,447,807 B1 | 11/2008 | Merry et al. | |
| 7,450,436 B2 | 11/2008 | Salessi et al. | |
| 7,467,253 B2 * | 12/2008 | Yero | 711/103 |
| 7,502,256 B2 | 3/2009 | Merry, Jr. et al. | |
| 7,509,441 B1 | 3/2009 | Merry et al. | |
| 7,515,471 B2 | 4/2009 | Oh et al. | |
| 7,596,643 B2 | 9/2009 | Merry, Jr. et al. | |
| 7,609,565 B2 | 10/2009 | Lee | |
| 7,653,778 B2 | 1/2010 | Merry, Jr. et al. | |
| 7,654,466 B2 * | 2/2010 | Maeda et al. | 235/492 |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |
| 7,733,712 B1 | 6/2010 | Walston et al. | |
| 7,765,373 B1 | 7/2010 | Merry et al. | |
| 7,870,128 B2 | 1/2011 | Jensen et al. | |
| 7,898,855 B2 | 3/2011 | Merry, Jr. et al. | |
| 7,912,991 B1 | 3/2011 | Merry et al. | |
| 7,936,603 B2 | 5/2011 | Merry, Jr. et al. | |
| 7,962,792 B2 | 6/2011 | Diggs et al. | |
| 8,078,918 B2 | 12/2011 | Diggs et al. | |
| 8,090,899 B1 | 1/2012 | Syu | |
| 8,095,851 B2 | 1/2012 | Diggs et al. | |
| 8,108,692 B1 | 1/2012 | Merry et al. | |
| 8,122,185 B2 | 2/2012 | Merry, Jr. et al. | |
| 8,127,048 B1 | 2/2012 | Merry et al. | |
| 8,135,903 B1 | 3/2012 | Kan | |
| 8,151,020 B2 | 4/2012 | Merry, Jr. et al. | |
| 8,161,227 B1 | 4/2012 | Diggs et al. | |
| 8,166,245 B2 | 4/2012 | Diggs et al. | |
| 8,243,525 B1 | 8/2012 | Kan | |
| 8,254,172 B1 | 8/2012 | Kan | |
| 8,261,012 B2 | 9/2012 | Kan | |
| 8,296,625 B2 | 10/2012 | Diggs et al. | |
| 8,312,207 B2 | 11/2012 | Merry, Jr. et al. | |
| 8,316,176 B1 | 11/2012 | Phan et al. | |
| 8,341,339 B1 | 12/2012 | Boyle et al. | |
| 8,375,151 B1 | 2/2013 | Kan | |
| 8,392,635 B2 | 3/2013 | Booth et al. | |
| 8,397,107 B1 | 3/2013 | Syu et al. | |
| 8,407,449 B1 | 3/2013 | Colon et al. | |
| 8,423,722 B1 | 4/2013 | Deforest et al. | |
| 8,433,858 B1 | 4/2013 | Diggs et al. | |
| 8,443,167 B1 | 5/2013 | Fallone et al. | |
| 8,447,920 B1 | 5/2013 | Syu | |
| 8,458,435 B1 | 6/2013 | Rainey, III et al. | |
| 8,478,930 B1 | 7/2013 | Syu | |
| 8,489,854 B1 | 7/2013 | Colon et al. | |
| 8,503,237 B1 | 8/2013 | Horn | |
| 8,521,972 B1 | 8/2013 | Boyle et al. | |
| 8,549,236 B2 | 10/2013 | Diggs et al. | |
| 8,583,835 B1 | 11/2013 | Kan | |
| 8,601,311 B2 | 12/2013 | Horn | |
| 8,601,313 B1 | 12/2013 | Horn | |
| 8,612,669 B1 | 12/2013 | Syu et al. | |
| 8,612,804 B1 | 12/2013 | Kang et al. | |
| 8,615,681 B2 | 12/2013 | Horn | |
| 8,638,602 B1 | 1/2014 | Horn | |
| 8,639,872 B1 | 1/2014 | Boyle et al. | |
| 8,683,113 B2 | 3/2014 | Abasto et al. | |
| 8,700,834 B2 | 4/2014 | Horn et al. | |
| 8,700,950 B1 | 4/2014 | Syu | |
| 8,700,951 B1 | 4/2014 | Call et al. | |
| 8,706,985 B1 | 4/2014 | Boyle et al. | |
| 8,707,104 B1 | 4/2014 | Jean | |
| 8,713,066 B1 | 4/2014 | Lo et al. | |
| 8,713,357 B1 | 4/2014 | Jean et al. | |
| 8,719,531 B2 | 5/2014 | Strange et al. | |
| 8,724,422 B1 | 5/2014 | Agness et al. | |
| 8,725,931 B1 | 5/2014 | Kang | |
| 8,745,277 B2 | 6/2014 | Kan | |
| 8,751,728 B1 | 6/2014 | Syu et al. | |
| 8,769,190 B1 | 7/2014 | Syu et al. | |
| 8,769,232 B2 | 7/2014 | Suryabudi et al. | |
| 8,775,720 B1 | 7/2014 | Meyer et al. | |
| 8,782,327 B1 | 7/2014 | Kang et al. | |
| 8,788,778 B1 | 7/2014 | Boyle | |
| 8,788,779 B1 | 7/2014 | Horn | |
| 8,788,880 B1 | 7/2014 | Gosla et al. | |
| 8,793,429 B1 | 7/2014 | Call et al. | |
| 8,825,940 B1 | 9/2014 | Diggs | |
| 2002/0073272 A1 | 6/2002 | Ko et al. | |
| 2003/0162549 A1 * | 8/2003 | Carlsson | 455/456 |
| 2003/0163633 A1 | 8/2003 | Aasheim et al. | |
| 2003/0182496 A1 | 9/2003 | Yoo | |
| 2003/0188092 A1 * | 10/2003 | Heath et al. | 711/111 |
| 2004/0015653 A1 * | 1/2004 | Trantham | 711/113 |
| 2005/0160195 A1 | 7/2005 | Bruner et al. | |
| 2005/0196165 A1 | 9/2005 | Dybsetter et al. | |
| 2006/0095699 A1 | 5/2006 | Kobayashi et al. | |
| 2006/0143426 A1 | 6/2006 | Wu | |
| 2006/0184736 A1 | 8/2006 | Benhase | |
| 2006/0190696 A1 | 8/2006 | Ito et al. | |
| 2006/0236392 A1 * | 10/2006 | Thomas et al. | 726/23 |
| 2006/0294338 A1 | 12/2006 | Fisher et al. | |
| 2007/0033362 A1 | 2/2007 | Sinclair | |
| 2007/0050536 A1 | 3/2007 | Kolokowsky | |
| 2007/0079065 A1 | 4/2007 | Bonella et al. | |
| 2007/0079097 A1 | 4/2007 | Karnowski et al. | |
| 2007/0136553 A1 | 6/2007 | Sinclair | |
| 2007/0192538 A1 | 8/2007 | Dawkins | |
| 2007/0208604 A1 * | 9/2007 | Purohit et al. | 705/9 |
| 2007/0233939 A1 | 10/2007 | Kim | |
| 2007/0245065 A1 | 10/2007 | Kagan et al. | |
| 2007/0247933 A1 | 10/2007 | Kagan | |
| 2008/0019189 A1 | 1/2008 | Lin | |
| 2008/0019196 A1 | 1/2008 | Lin | |
| 2008/0082726 A1 * | 4/2008 | Elhamias | 711/103 |
| 2008/0091872 A1 * | 4/2008 | Bennett et al. | 711/103 |
| 2008/0098164 A1 | 4/2008 | Lee et al. | |
| 2008/0126449 A1 | 5/2008 | Haitsma | |
| 2008/0162798 A1 | 7/2008 | Lofgren et al. | |
| 2008/0270678 A1 * | 10/2008 | Cornwell et al. | 711/103 |
| 2008/0282024 A1 | 11/2008 | Biswas et al. | |
| 2008/0294813 A1 | 11/2008 | Gorobets | |
| 2009/0089492 A1 * | 4/2009 | Yoon et al. | 711/103 |
| 2009/0091979 A1 * | 4/2009 | Shalvi | 365/185.09 |
| 2009/0125782 A1 | 5/2009 | Josefiak et al. | |
| 2009/0138654 A1 | 5/2009 | Sutardja | |
| 2009/0150599 A1 | 6/2009 | Bennett | |
| 2009/0172213 A1 | 7/2009 | Jayachandran et al. | |
| 2009/0204853 A1 * | 8/2009 | Diggs et al. | 714/47 |
| 2010/0061152 A1 | 3/2010 | De Caro et al. | |
| 2010/0174849 A1 | 7/2010 | Walston et al. | |

(56) References Cited

U.S. PATENT DOCUMENTS

| | | |
|---|---|---|
| 2010/0250793 A1 | 9/2010 | Syu |
| 2011/0099323 A1 | 4/2011 | Syu |
| 2011/0191526 A1* | 8/2011 | Haukness et al. ............ 711/103 |
| 2011/0283049 A1 | 11/2011 | Kang et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

OTHER PUBLICATIONS

Office Action dated Feb. 28, 2011 from U.S. Appl. No. 12/410,304, 11 pages.
Office Action dated Nov. 16, 2010 from U.S. Appl. No. 12/410,304, 22 pages.
Office Action dated May 25, 2011 from U.S. Appl. No. 12/326,780, 37 pages.
Office Action dated Jun. 3, 2011 from U.S. Appl. No. 12/410,304, 4 pages.
Notice of Panel Decision dated Aug. 18, 2011 from U.S. Appl. No. 12/410,304, 2 pages.
Brief on Appeal submitted on Sep. 19, 2011 in U.S. Appl. No. 12/410,304 in 14 pages.
Examiner's Answer mailed on Oct. 7, 2011 received in U.S. Appl. No. 12/410,304 in 14 pages.
Office Action dated Nov. 8, 2011 from U.S. Appl. No. 12/326,780, 39 pages.
Office Action mailed on Mar. 20, 2012 received in U.S. Appl. No. 12/326,780 in 24 pages.
Advisory Action dated May 22, 2013 from U.S. Appl. No. 12/326,780, 11 pages.
Office Action dated Nov. 30, 2012 received in U.S. Appl. No. 12/326,780, 46 pages.
Office Action dated Oct. 8, 2013 from Chinese Patent Application No. 201010134420.0, filed Mar. 16, 2010, 16 pages.
Interview Summary dated Sep. 2, 2011 from U.S. Appl. No. 12/326,780, 3 pages.
Notice of Allowance dated Dec. 11, 2013 from U.S. Appl. No. 12/326,780, 15 pages.
Decision on Appeal dated Jul. 31, 2014 from U.S. Appl. No. 12/410,304, filed Mar. 24, 2009, 10 pages.
Office Action dated Jul. 25, 2013 from Chinese Patent Application No. 201010134420.0 filed Jan. 7, 2010 and English translation of the State Intellectual Property Office of P.R.C. Search Report, 20 pages.
Office Action dated Apr. 15, 2014 from Chinese Patent Application No. 201010134420.0 filed Jan. 7, 2010 and English translation of the State Intellectual Property Office of P.R.C. Search Report, 13 pages.
Chinese Office Action dated Dec. 16, 2014 from related Chinese Application Serial No. 201010002144.2, 11 pages.
Meiman Lin Syu, U.S. Appl. No. 12/410,304, filed Mar. 24, 2009, 27 pgs.
Second Office Action dated Jun. 26, 2014 from Chinese Patent Application No. 201010134420.0 filed Mar. 16, 2010 and English Translation, 8 pages.
Notice of Allowance dated Apr. 25, 2014 from U.S. Appl. No. 12/326,780, 10 pgs.
Notice of Allowance dated Oct. 24, 2014 from U.S. Appl. No. 12/410,304, 36 pgs.
Notice of Allowance dated Mar. 13, 2015, from U.S. Appl. No. 12/410,304 11 pgs.
First Office Action, and translation thereof, from Chinese Application No. 201010002144.2, dated Jul. 25, 2013, 20 pp.
Second Office Action, and translation thereof, from Chinese Application No. 201010002144.2, dated Apr. 15, 2014, 26 pp.

* cited by examiner

SYSTEMS AND METHODS FOR IMPROVING THE PERFORMANCE OF NON-VOLATILE MEMORY OPERATIONS

BACKGROUND

1. Technical Field

The present invention relates to non-volatile memory, and more specifically, to systems and methods for improving the performance of non-volatile memory operations performed in a storage subsystem.

2. Description of the Related Art

Non-volatile memory (NVM) manufacturers typically build in timing cycles to accommodate the time that is needed to complete page program and block erase operations. For flash memory, a typical page program cycle may last about 200-250 µs, with a maximum of 500-750 µs, and a typical block erase cycle may last about 1.5 ms, with a maximum of 2 ms. However, timing is not uniform across the physical NVM devices and the actual time it takes to complete a page program or block erase operation can vary. Therefore, in many systems, a controller that executes such an operation is required to constantly poll the status register in a programming loop until the operation is completed. The time spent in this waiting state is often wasted and system performance suffers as a result.

SUMMARY

Disclosed herein are systems and methods for optimizing non-volatile memory (NVM) operations in a storage subsystem. The systems and methods recognize and recapture potentially unused processing time in common page program and block erase operations. In one embodiment, a characterization module within a controller executes a characterization procedure by performing random page program and block erase operations on one or more NVM devices in an array. Actual time values for the NVM devices obtained from the characterization procedure are then stored in a calibration table. The characterization procedure may be executed at start-up, or periodically as triggered by certain monitored events such as every 1,000th hour of power-on time so that the values in the calibration table are reflective of the actual physical condition of the individual NVM devices.

A task manager uses these time values in the calibration table to estimate the time needed for completing certain memory operations. Based on the estimated time for completion, the task manager assigns certain tasks, including memory or non-memory operations, to be executed during page program and/or block erase cycles, so that otherwise unused processing time can be efficiently utilized.

BRIEF DESCRIPTION OF THE DRAWINGS

Preferred embodiments of the invention will now be described with reference to the drawings summarized below. These drawings and the associated description are provided to illustrate preferred embodiments of the invention, and not to limit the scope of the invention.

DETAILED DESCRIPTION OF PREFERRED EMBODIMENTS

Systems and methods for improving the performance of non-volatile memory operations will now be described with reference to the drawings. Where possible, the same reference numbers are used throughout the drawings to refer to the same or like components. This description is intended to illustrate certain preferred embodiments, but other embodiments that are apparent to those of ordinary skill in the art, including embodiments which do not provide all of the benefits and features set forth herein, are also within the scope of this invention. Thus, nothing in this detailed description is intended to suggest that any particular feature or component is essential. The invention is defined by the claims.

1. OVERVIEW

Figure 1:
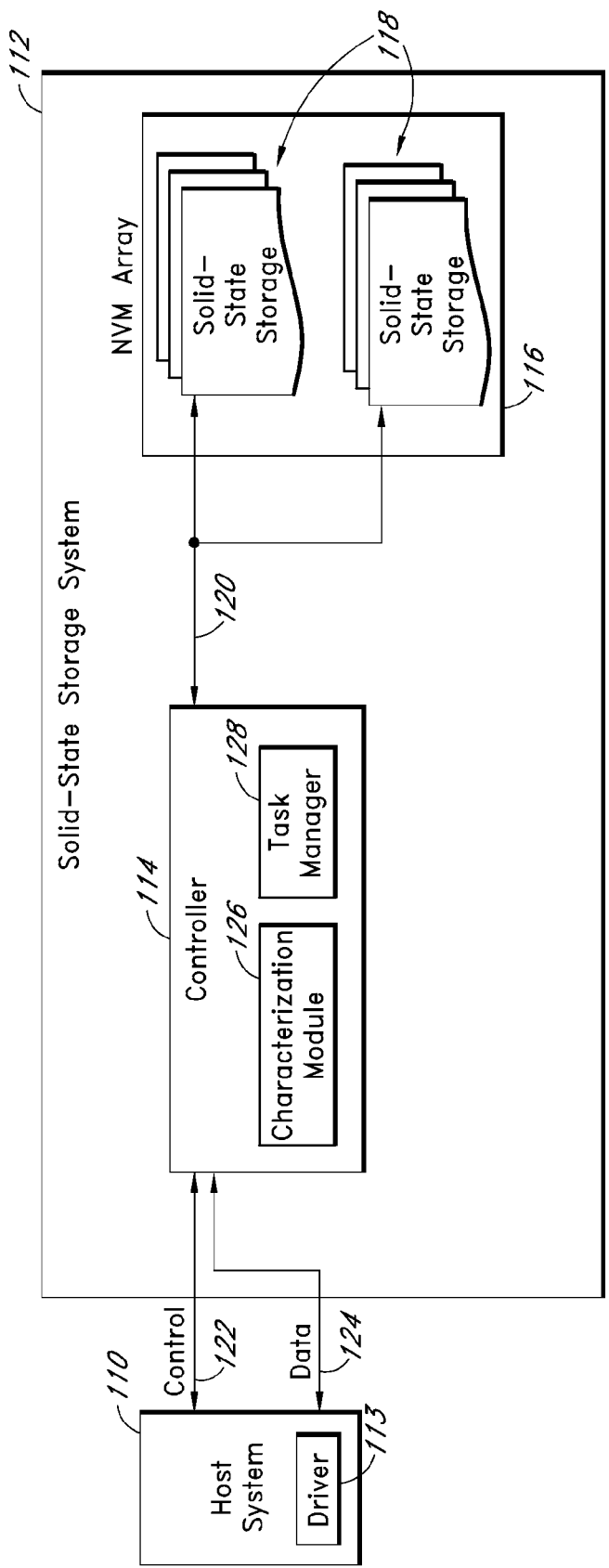
FIG. 1 is a block diagram illustrating a host system linked to a solid-state storage subsystem according to one embodiment of the invention.

FIG. 1 is a block diagram illustrating a host system 110 connected to a solid-state storage subsystem 112 according to one embodiment of the invention. The host system 110 comprises a computer such as a personal computer, workstation, router, blade server or other type of computing device. For example, the host system 110 may be a military system, a flight computer or other flight avionics system, a wearable computer used for military applications, a high-speed data recorder, a medical device, an industrial control system, an interactive kiosk, a personal digital assistant, a laptop computer, an interactive wireless communication device, a point-of-sale device, or the like. The solid-state storage subsystem 112 provides the data storage for the host system 110 and may also provide the operating system functionality as well as the boot process data for the host system 110. The host system 110 executes a driver program 113 that provides functionality for communicating with the subsystem 112, such as by issuing commands in accordance with an ATA or other standard.

In one embodiment, the solid-state storage subsystem 112 comprises a controller 114 and a non-volatile memory (NVM) array 116. The NVM array 116 may, but need not, be implemented using NAND memory components. As is conventional, the controller 114 is configured (typically via firmware) to write data to, and read data from, the NVM array 116 in response to commands from the host 110. The controller may implement a wear-leveling algorithm to distribute write operations across memory blocks of the NVM array 116. The storage subsystem 112 may be in the form of a detachable device and may communicate with any standard or unique communications interface, including but not limited to parallel ATA, serial ATA, RS232/423, PCMCIA, USB, Firewire (IEEE-1394), FibreChannel, PCI Express bus, SD/MMC, SCSI, or SAS. The storage subsystem 112 may also receive its power from the host 110 over this interface.

As discussed in detail below, as the controller 114 performs write operations to the NVM array 116, it updates a non-user-data area of the array (i.e., an area not exposed to the host's operating system) with usage statistics information reflective of the number of program/erase cycles that have been executed. This information preferably includes a set of counters, with different counters corresponding to different blocks or areas of the memory array; however, the usage statistics may be maintained in any of a variety of formats. These counters are initially set to zero (or some other selected starting value) when the device is manufactured or first initialized, and are incremented over time as program/erase cycles are performed. In some embodiments, the usage statistics data stored in the memory subsystem 112 also includes timestamps, or other temporal data, received from the host. This temporal data may be used to calculate the useful life of the subsystem 112 in terms of time (e.g., days and hours), as may be desirable for some applications.

The storage subsystem 112 may, for example, be a solid-state memory card that plugs into a slot of the host system 110 and complies with at least one of the following card specifications: CompactFlash, PCMCIA, SmartMedia, MultiMediaCard, SecureDigital, Memory Stick, and ATA/ATAPI. The storage subsystem 112 may, for example, have a housing and signal interface that complies with one of the following specifications: sub 1 inch hard disk drive, 1.8 inch hard disk drive, 2.5 inch hard disk drive and 3.5 inch hard disk drive. A custom form factor and/or signal interface may alternatively be used.

In one embodiment, the controller 114 executes a firmware program to perform processes as described herein and comprises an ATA flash disk controller, for example, a commercially available ATA flash disk controller. The controller 114 may alternatively be implemented using another type of device, such as an application-specific integrated circuit (ASIC), or may comprise multiple distinct devices. Further, although the controller 114 preferably executes firmware, a controller that does not execute a firmware program may be used.

The NVM array 116 comprises a plurality of solid-state storage devices 118 coupled to the controller 114. The solid-state storage devices 118 may comprise, for example, flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM chips. The solid-state storage devices 118 may be physically divided into blocks, pages and sectors, as is known in the art.

The host system 110 exchanges control signals 122 with the controller 114 to coordinate the reading and writing of data to and from the solid-state storage (NVM) devices 118. The controller 114 handles the read and write operations by sending memory control signals 120 to the NVM array 116. The control signals 122 may include, for example, read commands and write commands. The control signals 122 may be used to send commands selected from, for example, industry standard command sets such as those provided by ATA, CF card or PC card standards to read from or write data to standard storage devices. The host system 110 also exchanges data signals 124 with the controller 114. The data signals may include, for example, data to be written to the NVM array 116, data read from the NVM array, and data that relate to monitored conditions and usage statistics of the NVM array.

2. PROCESSING TIMES IN TYPICAL PAGE PROGRAM AND ERASE BLOCK OPERATIONS

Figure 2:
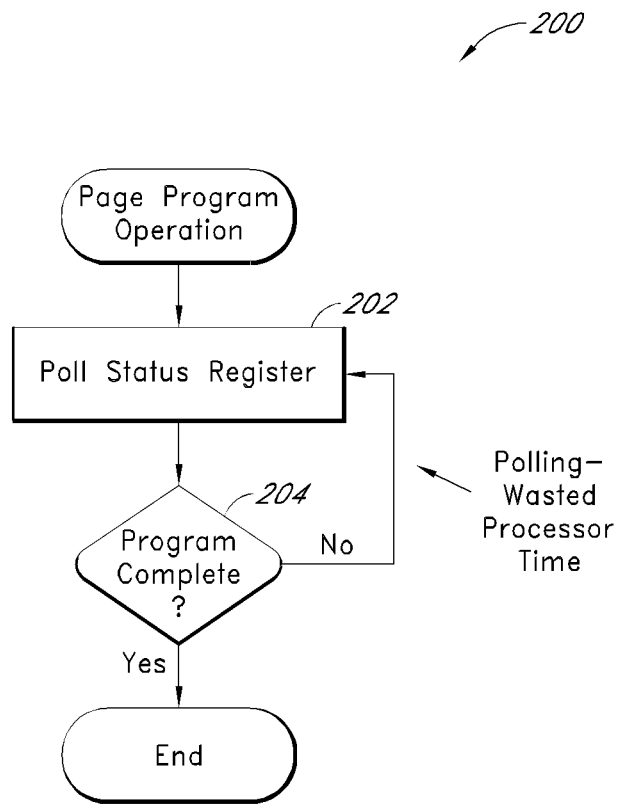
FIG. 2 is a flow diagram showing a typical page program operation.
Figure 3:
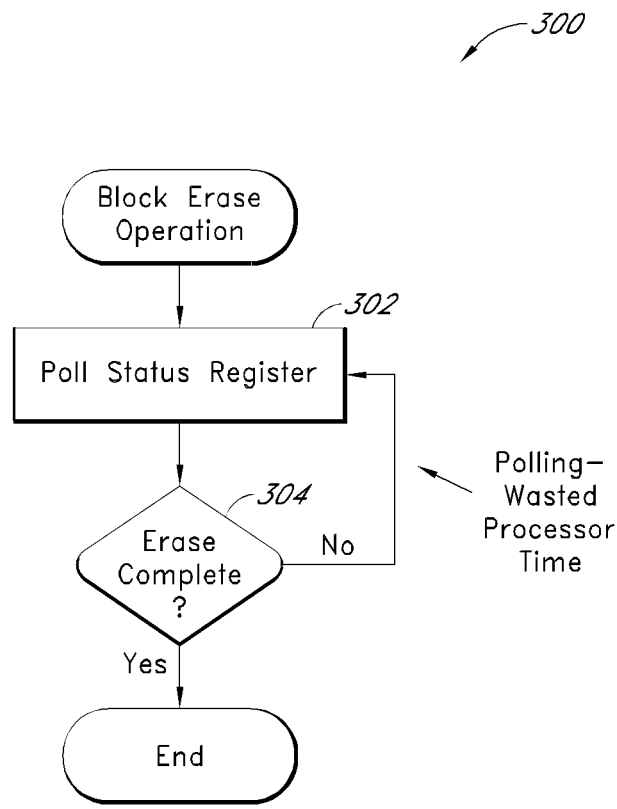
FIG. 3 is a flow diagram showing a typical block erase operation.

Major NVM manufacturers typically build in timing cycles to accommodate the time that is needed to complete page program and block erase operations. For flash memory, a typical page program cycle lasts about 200-250 μs, with a maximum of 500-750 μs, and a typical block erase cycle lasts about 1.5 ms, with a maximum of 2 ms. FIG. 2 is a flow diagram showing a typical method 200 of programming a page. Once a controller 114 initiates the page program function, it repeatedly polls the status register in a loop at states 202 and 204 until programming is complete. A similar situation takes place in block erase operations. FIG. 3 is a flow diagram showing a typical method 300 of erasing a block. The controller 114 that is erasing a block in the memory also needs to poll the status register at state 302 and loops until the operation is complete at state 304.

In both of the above operations, a substantial amount of processor time in the controller is unused as a result of waiting for either a page program or block erase operation to complete. Because there is a wide disparity between the typical and maximum timing of each operation, the controller is unable to anticipate how long this wait time lasts and thus cannot effectively make use of this "wasted" processor time. The disclosed systems and methods enable the processor to perform other tasks, including memory or non-memory operations, while these memory operations are taking place.

The page program and block erase operations are shown as examples only. Those skilled in the art will recognize that embodiments of the invention are applicable to other memory or non-memory operations as well.

3. CHARACTERIZATION OF NVM DEVICES

Figure 4:
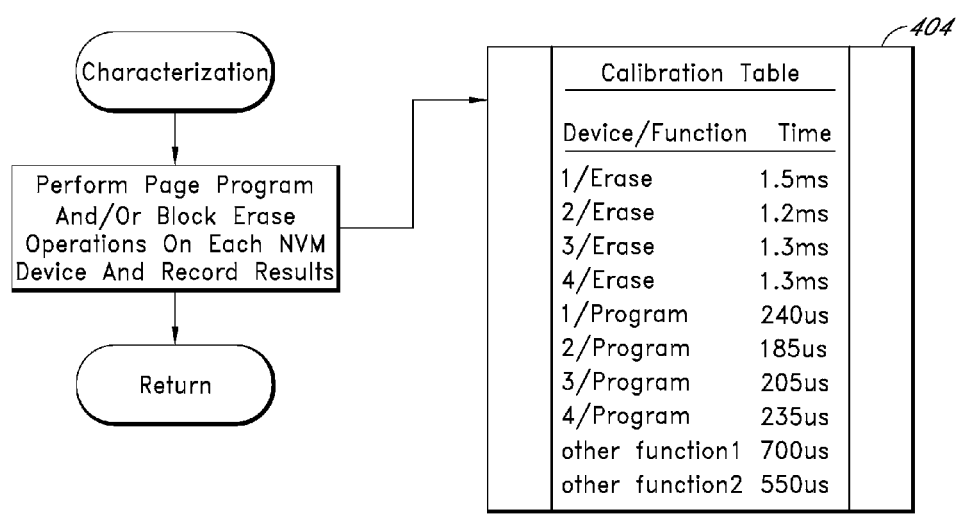
FIG. 4 is a flow diagram illustrating a method of creating a calibration table in accordance with one embodiment.

In one embodiment, NVM devices are characterized by the characterization module 126 within the controller 114 in order to measure the actual times involved in page program and block erase operations. With the actual time values recorded, the controller can thus anticipate expected wait time during these operations and may perform background tasks, such as housekeeping and streamlining data, during page program and block erase operations. One embodiment provides a characterization function that is run at power-up and/or some other time. In one embodiment, the characterization function performs, for testing purposes, sampled page program and block erase commands on each NVM device within the storage subsystem and stores the execution times in a calibration table. In another embodiment, the characterization module 126 observes and records execution time data related to memory operations that take place during the normal course of operation of the storage sub-system. In other embodiments, the characterization module 126 may store separate execution time data related memory operations for particular blocks. These program and erase times are used to approximate the time needed for actual operations. FIG. 4 shows an example of characterization operation performed on four example NVM devices in the storage subsystem. For example, as shown in the characterization table 404, NVM device No. 1 has a recorded erase time of 1.5 ms and a recorded program time of 240 μs. In one embodiment, the times recorded in the calibration table 404 are averages of the times obtained from the characterization operation. In one embodiment, weighted averages are obtained with greater weight given to values obtained in more recent characterization operations. Other embodiments record the fastest or slowest times from the characterization operation.

Because the timing of page program and block erase operations can vary over the life of the NVM device or change as a result the operating environment, the characterization function may be run at periodic intervals so that values stored in the calibration table remain reflective of the actual operation times of the devices. For example, re-characterization may be used with a monitoring mechanism associated with the NVM so that re-characterization is triggered by one or more monitored events, such as:

1) when there is a temperature change of, for example, every 10 degrees C., 2) when there is an NVM usage increase or decrease of, for example, every 10%, 3) when the NVM array has been operating for a certain period (for example, at every 1,000th hour of power-on time), 4) when the NVM array has been powered up for a certain amount of time (for example, at every 10th power-up), and/or 5) when the supply voltage level to the NVM array changes by a certain threshold amount (for example, every 0.1 V for a standard 3.3V supply voltage).

Further examples of trigger events and an example monitoring mechanism for NVM are fully described in co-pending U.S. patent application Ser. No. 11/429,936, filed May 8, 2006, the disclosures of which are hereby fully incorporated by reference. In one embodiment, the characterization module 126 stores, and the task manager 128 uses, different sets of calibration data for different monitored environmental conditions. For example, for each block the characterization module 126 could store two sets of execution times, one for a first temperature range, and the other for a second temperature range.

4. TIME AND TASK ASSIGNMENT FUNCTIONS

Figure 5:
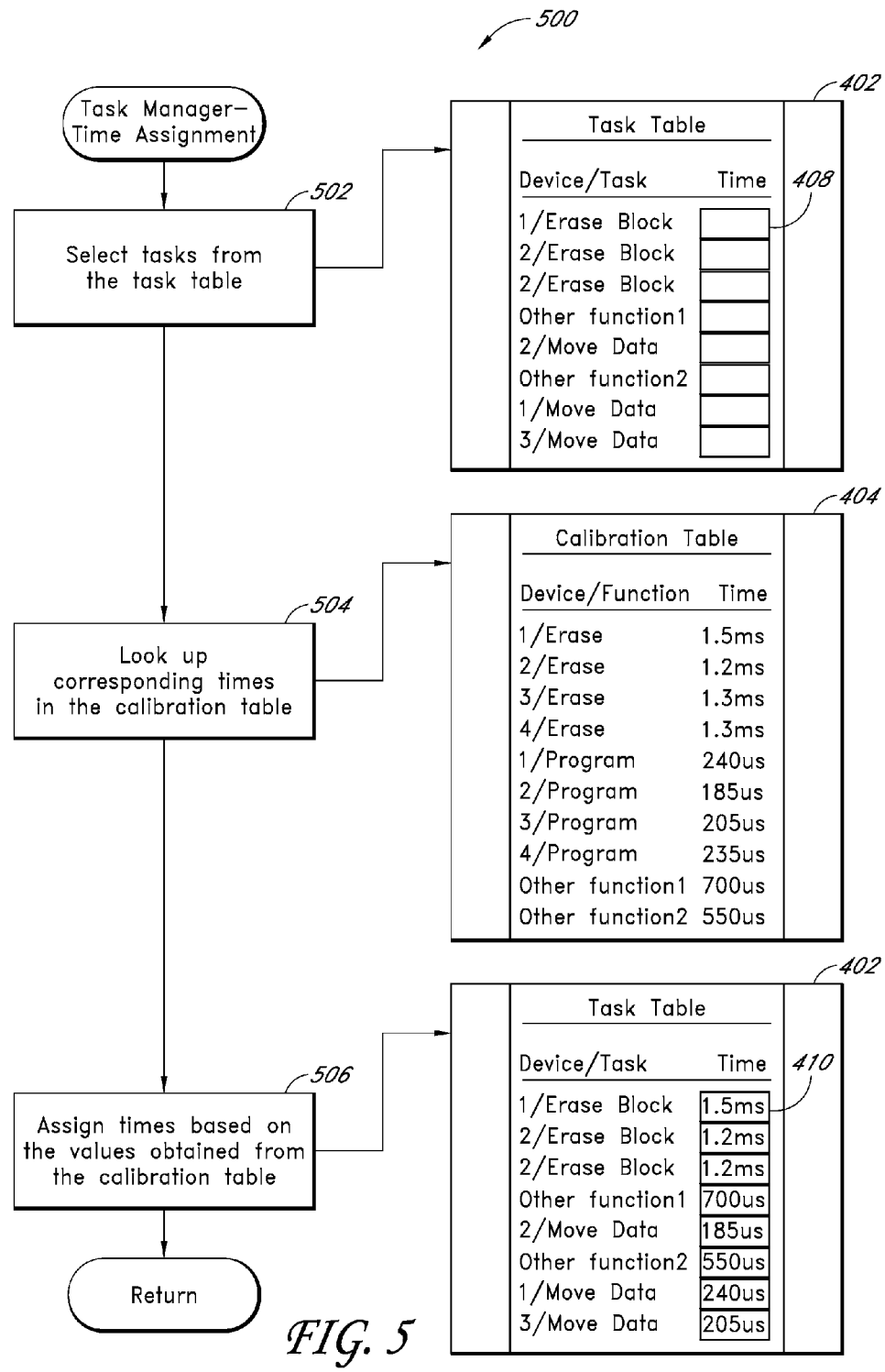
FIG. 5 is a flow diagram illustrating the time assignment operation of the task manager in accordance with one embodiment.

In one embodiment, the task manager 128 performs two basic functions: a time assignment function and a task assignment function. FIG. 5 shows the time assignment function in accordance with one embodiment. The controller 114 may have a number of tasks slated for execution in a task table 402. In one embodiment, the task table 402 includes lower priority tasks that the controller may need to perform during the course of normal operation. Examples of low priority tasks include computing usage statistic data, pre-processing queued commands, prioritizing queued commands, etc. As shown, the time assignment function takes tasks in the task table 402 and looks up the recorded execution time in the calibration table 404. For example, the first task shown in the task table 402 is a block erase operation 408 for NVM device No. 1 in the storage subsystem 116. The time assignment function finds a corresponding time in the calibration table 404, which is 1.5 ms. Then the entry 410 in the task table 402 is updated with the time located in the calibration table 404. In one embodiment, the calibration table 402 may include NVM operation with pre-set values that are not obtained through characterization. For example, the calibration table 402 shows NVM operation such as "other function 1" and "other function 2."

Figure 6:
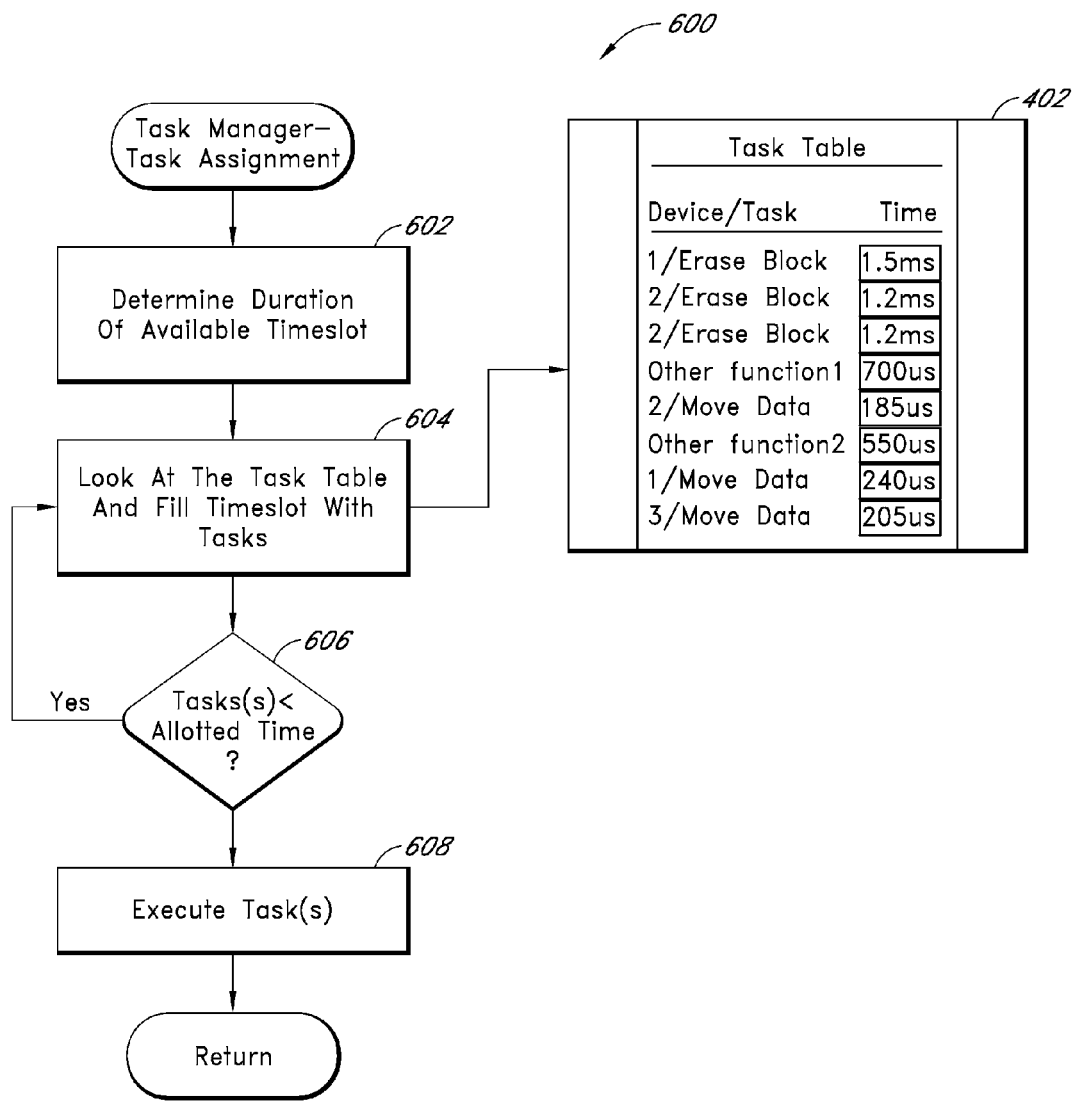
FIG. 6 is a flow diagram illustrating the task assignment operation of the task manager in accordance with one embodiment.

FIG. 6 illustrates the operation of the task assignment function 600 in accordance with one embodiment. At state 602, the task manager 128 determines the duration of the available timeslot based on the current NVM operation at hand. The current operation may be an operation that is not in the task table 402, though in some embodiments that it may be a task within the task table 402. In one embodiment, the controller 114 launches the task manager 128 and provides the task manager with an expected duration of the current NVM operation. The expected duration may be obtained from the task table 402. For example, the topmost operation in task table 402 is a block erase operation that takes 1.5 ms. The value of 1.5 ms is thus supplied to the task manager 128. In another embodiment, the task manager 128 determines the duration by directly obtaining the value from the task table 402.

Then at state 604, the task manager 128 selects one or more tasks from the task table 402 to be executed during the execution of the current NVM operation. In the example mentioned above, the task manager finds tasks to be executed within the allotted 1.5 ms. At state 606, the task manager determines if there is still time left in the allotted time for additional tasks. In one embodiment, additional tasks are added until there is no task left that can be executed within the remaining time. Once the last task is added, the task manager 128 causes the selected tasks to be executed in state 608. In one embodiment, the tasks from the task table can be selected out of turn as long as they can be executed during the available time slot. For example, the task manager 128 may select "Other function 1" and "Other function 2" to be executed during the 1.5 ms allotted, since both of those tasks only add up to 1.25 ms (700 µs+550 µs).

Figure 7:
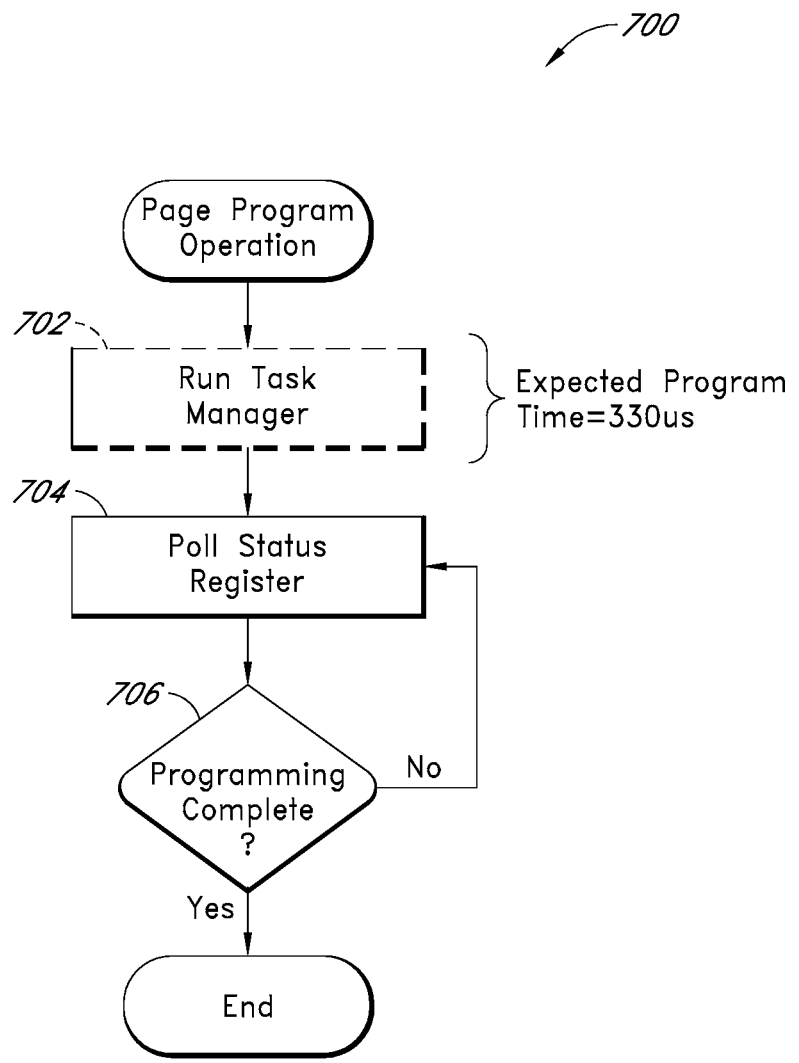
FIG. 7 is a flow diagram illustrating the operation of the task manager during a page program operation in accordance with one embodiment.

Having described the two primary functions of the task manager 128, FIG. 7 shows an example page program operation 700 in which the task manager 128 is executed in accordance with one embodiment. Upon execution of the page program operation, the controller 114 launches or otherwise causes the task manager 128 to be executed at state 702. The task manager is given the expected execution time of the page program command, based on the value obtained from the calibration table 402 in one embodiment. The task manager 128 selects one or more tasks from the task table 404 that can be executed within the recorded execution time of the example page program operation as shown, which is 330 µs. The tasks are selected in accordance with, for example, the method shown in FIG. 6. These selected tasks are then executed, and upon their completion, the controller 114 then polls the status register at state 704. Because the task manager 128 selects the appropriate tasks that the controller 114 can execute during the program page operation, the wait time the controller 114 must spend to poll the status register at state 704 is minimized. When the page program operation completes at state 706, the operation ends. Performance of the controller is improved as a result of utilizing previously unused wait time to execute NVM tasks.

Figure 8:
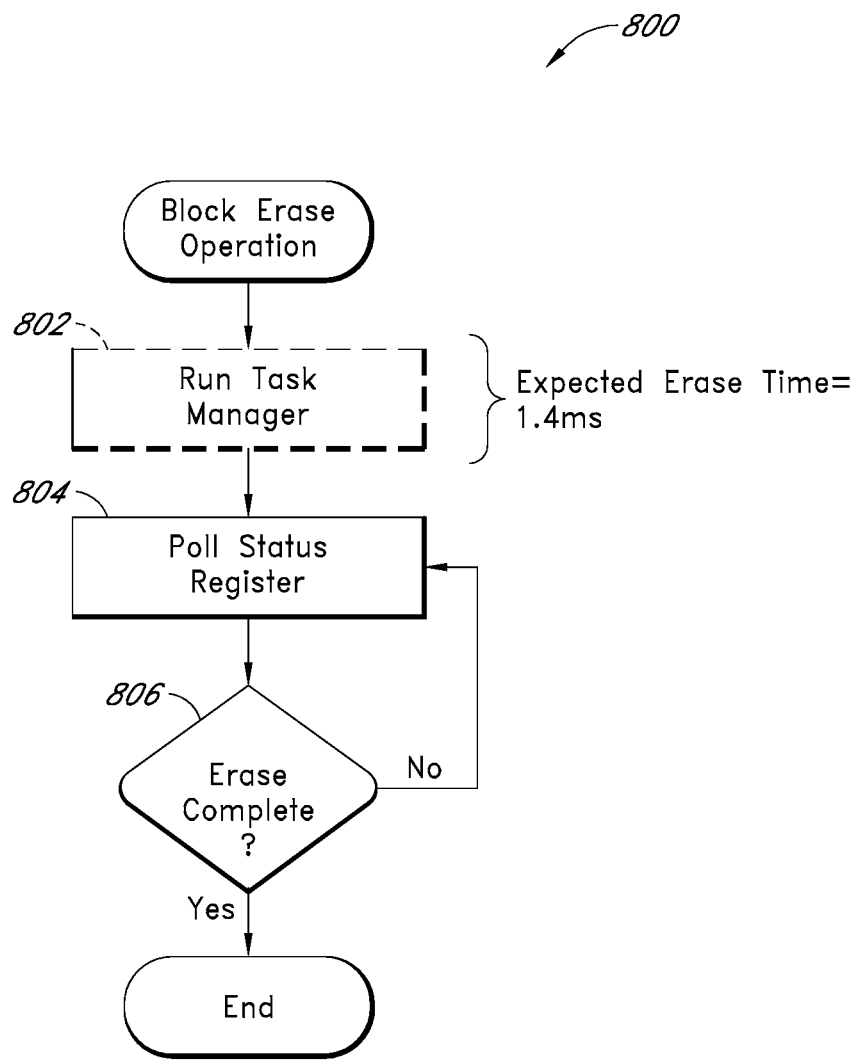
FIG. 8 is a flow diagram illustrating the operation of the task manager during a block erase operation in accordance with one embodiment.

FIG. 8 shows a block erase operation 800 in which the task manager 128 is executed in accordance with one embodiment. Upon execution of the block erase operation, the controller 114 launches or otherwise causes the task manager 128 to be executed at state 802. The task manager is given the expected execution time of the block erase command, based on the value obtained from the calibration table 402 in one embodiment. The task manager 128 selects one or more tasks from the task table 404 that can be executed within the recorded execution time of the example block erase operation as shown, which is 1.4 ms. The tasks are selected in accordance with, for example, the method shown in FIG. 6. These selected tasks are then executed, and upon their completion, the controller 114 then polls the status register at state 804. Because the task manager 128 selects the appropriate tasks that the controller 114 can execute during the block erase operation, the wait time the controller 114 must spend to poll the status register at state 804 is minimized. When the page program operation completes at state 806, the operation ends.

5. CONCLUSION

Embodiments of this invention can be, and typically would be, implemented solely in the storage subsystem, such that no special hardware or software needs to be added to the host.

Alternatively, all of the methods and processes described above may be embodied in, and fully automated via, software code modules executed by one or more general purpose computers or processors. The code modules may be stored in any type of computer-readable medium or other computer storage device. Some or all of the methods may alternatively be embodied in specialized computer hardware. In addition, the components referred to herein may be implemented in hardware, software, firmware, or a combination thereof.

In general, the word "module," as used herein, refers to logic embodied in hardware and/or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein can be implemented in hardware (general purpose or application-specific), software, and/or firmware. Generally, the modules described herein refer to logical modules that may be combined with other modules or divided into sub-modules despite their physical organization or storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A storage subsystem for storing data provided by a host system, the storage subsystem comprising:
    a non-volatile solid-state memory array; and
    a controller comprising:
        a characterization module configured to record, in a calibration table, a first set and a second set of execution times of memory access operations performed on a plurality of memory devices in the non-volatile solid-state memory array, the first set of execution times corresponding to a first environmental condition and the second set of execution times corresponding to a second environmental condition; and
        a task manager configured to:
            determine a first execution time associated with a current memory access operation;
            select a set of execution times from the first set and the second set of execution times based on a current environmental condition;
            determine, for each task in a plurality of available tasks, a task execution time based on a type of the task and the selected set of execution times, wherein the determined task execution time corresponds to a recorded execution time in the selected set of execution times; and
            select from the plurality of available tasks, based on the first execution time and the task execution time for each task in the plurality of available tasks, one or more memory access tasks to be executed on the plurality of memory devices while the controller is performing the current memory access operation, the selected one or more memory access tasks having a total execution time that is less than the first execution time associated with the current memory access operation, wherein the one or more memory access tasks to be executed comprise at least one of: a read host data operation, a program operation, and an erase operation, and wherein the current environmental condition corresponds to one of the first environmental condition and the second environmental condition.

2. The storage subsystem of claim 1, wherein the memory access operations are memory access operations executed during the course of normal usage of the storage subsystem.

3. The storage subsystem of claim 1, wherein the memory access operations are calibration operations.

4. The storage subsystem of claim 3, wherein the characterization module is configured to perform calibration operations as triggered by a monitored event.

5. The storage subsystem of claim 4, wherein the monitored event is a temperature change by one or more present threshold values.

6. The storage subsystem of claim 4, wherein the monitored event is an increase in usage of the storage subsystem by a threshold amount.

7. The storage subsystem of claim 4, wherein the monitored event is reaching a threshold amount of power-on time.

8. The storage subsystem of claim 4, wherein the monitored event is reaching a threshold number of power up.

9. The storage subsystem of claim 4, wherein the monitored event is a voltage level change by a threshold amount.

10. The storage subsystem of claim 1, wherein the recorded execution times comprise execution time data associated with particular blocks of the non-volatile memory array.

11. The storage subsystem of claim 10, wherein the recorded execution times comprise separate execution time data associated with particular blocks of the non-volatile memory array.

12. The storage subsystem of claim 10, wherein the recorded execution times comprise execution time data associated with page programming cycles of particular blocks of the non-volatile memory array.

13. The storage subsystem of claim 10, wherein the recorded execution times comprise execution time data associated with block erase cycles of particular blocks of the non-volatile memory array.

14. The storage subsystem of claim 1, wherein the recorded execution times comprise execution time data associated with different monitored conditions of the non-volatile memory array.

15. A method for optimizing memory operations executed by a controller for a storage subsystem for storing data provided by a host system, the method comprising:
   executing a plurality of memory access operations on a plurality of memory devices in a storage subsystem for a first environmental condition and for a second environmental condition;
   recording a first set of execution times of the plurality of memory access operations corresponding to the first environmental condition;
   recording a second set of execution times of the plurality of memory access operations corresponding to the second environmental condition;
   determining a first execution time associated with a current memory access operation;
   selecting a set of execution times from the first set and the second set of execution times based on a current environmental condition;
   determining, for each task in a plurality of available tasks, a task execution time based on a type of the task and the selected set of execution times, wherein the determined task execution time corresponds to a recorded execution time in the selected set of execution times;
   selecting from the plurality of available tasks, based on the first execution time and the task execution time for each task in the plurality of available tasks, one or more memory access tasks with a total recorded execution time that is less than the first execution time associated with the current memory access operation; and
   executing the selected one or more memory access tasks while the current memory access operation is being executed;
   wherein the selected one or more memory access tasks comprise at least one of: a read host data operation, a program operation, and an erase operation, and
   wherein the current environmental condition corresponds to one of the first environmental condition and the second environmental condition.

16. The method of claim 15, wherein the memory access operations are memory operations executed during the course of normal usage of the storage subsystem.

17. The method of claim 15, wherein the memory access operations are calibration operations.

18. The method of claim 15, wherein the current memory access operation is a page programming operation.

19. The method of claim 15, wherein the current memory access operation is a block erase operation.

20. The method of claim 15, wherein the executing and recording are performed when triggered by a monitored event.

21. The method of claim 20, wherein the monitored event is a temperature change by one or more present threshold values.

22. The method of claim 20, wherein the monitored event is an increase in usage of the storage subsystem by a threshold amount.

23. The method of claim 20, wherein the monitored event is reaching a threshold amount of power-on time.

24. The method of claim 20, wherein the monitored event is reaching a threshold number of power up.

25. The method of claim 20, wherein the monitored event is a voltage level change by a threshold amount.

26. A non-transitory computer-readable medium having stored thereon executable code which, when executed by a storage subsystem, causes the computer to perform the method of claim 15.

27. A storage subsystem, comprising:
   a solid state non-volatile memory array, and
   a controller configured to write data to, and read data from, the solid state non-volatile memory in response to memory access commands received from a host system, the controller additionally configured to record, for each of a plurality of regions of the non-volatile solid state memory array, execution time data reflective of memory access operation execution times for the respective regions for a first environmental condition and for a second environmental condition, the controller further operative configured to:
   select a set of execution times from the recorded execution times based on a current environmental condition;
   determine, for each task in a plurality of available tasks, a task execution time based on a type of the task and the selected set of execution times, wherein the determined task execution time corresponds to a recorded execution time in the selected set of execution times; and
   select from the plurality of available tasks, based on the task execution time for each task in the plurality of available tasks, memory access tasks to perform concurrently with particular memory access operations initiated by the host system, the selected memory access tasks comprising at least one of: a read host data operation, a program operation, and an erase operation, and the current environmental condition corresponding to one or the first environmental condition and the second environmental condition.

* * * * *